United States Patent [19]
van Lengerich

[11] Patent Number: 6,096,363
[45] Date of Patent: Aug. 1, 2000

[54] LOW MOLECULAR WEIGHT GLASSY CARBOHYDRATE MATRIX ENCAPSULATING AN EMULSIFIER DRY MIX

[75] Inventor: Bernhard van Lengerich, Plymouth, Minn.

[73] Assignee: General Mills, Inc., Minneapolis, Minn.

[21] Appl. No.: 09/453,456

[22] Filed: Dec. 3, 1999

Related U.S. Application Data

[62] Division of application No. 08/909,597, Aug. 12, 1997, Pat. No. 5,972,404.

[51] Int. Cl.$^7$ ...................................................... A21D 2/08
[52] U.S. Cl. .............................. 426/549; 426/89; 426/96; 426/555; 426/658; 426/443; 426/496
[58] Field of Search ........................... 426/89, 94, 96, 426/549, 555, 658, 661, 443, 496

[56] References Cited

U.S. PATENT DOCUMENTS

| | | | |
|---|---|---|---|
| 4,689,235 | 8/1987 | Barnes et al. | 426/89 |
| 5,004,595 | 4/1991 | Cherukuri et al. | 426/660 X |
| 5,009,900 | 4/1991 | Levine et al. | 426/96 |
| 5,011,532 | 4/1991 | Fuisz | 426/660 X |
| 5,087,461 | 2/1992 | Levine et al. | 426/96 |
| 5,096,492 | 3/1992 | Fuisz | 106/215 |
| 5,183,690 | 2/1993 | Carr et al. | 427/213.31 |
| 5,387,431 | 2/1995 | Fuisz | 426/658 |
| 5,565,407 | 10/1996 | Southard | 504/116 |
| 5,597,608 | 1/1997 | Fuisz | 426/658 |
| 5,609,902 | 3/1997 | Inakuma et al. | 476/466 |

*Primary Examiner*—Milton Cano
*Attorney, Agent, or Firm*—John A. O'Toole; Douglas J. Taylor; L. MeRoy Lillehaugen

[57] ABSTRACT

Food compositions in the form of a glassy low molecular carbohydrate matrix comprising an emulsifier. The food compositions comprise about 50 to 90% of a low molecular carbohydrate and the balance emulsifier. The food compositions are in powder form (1000 $\mu$m>) and are useful as emulsifier ingredients in dry mixes for dough and batters for prepared foods such as layer cakes, muffins, breads and pancakes. Also disclosed are preparation methods involving heating the low molecular carbohydrate to above its melting point, admixing the emulsifier to form a magma, rapidly cooling the magma sufficiently low enough to form a solid matrix and size reducing to form a powder of the requisite size.

11 Claims, 2 Drawing Sheets

LOW MOLECULAR WEIGHT GLASSY CARBOHYDRATE MATRIX ENCAPSULATING AN EMULSIFIER DRY MIX

CROSS REFERENCE

The present application is a division of U.S. application Ser. No. 08/909,597 filed on Aug. 12, 1997 now U.S. Pat. No. 5,972,404.

FIELD OF THE INVENTION

The present invention relates to food products and to methods for the preparation and use thereof. More particularly, the present invention is directed towards glassy dextrin and sugar matrices containing emulsifiers. The emulsifier containing matrices are useful ingredients for dry mixes for prepared foods such as baked goods as well as to the processes for preparing and using such matrices.

BACKGROUND

Dry mixes for food products are widely used. Conventionally, the consumer adds liquid ingredients such as water, milk, eggs, oil, shortening, butter, etc. to the dry mix to prepare a batter or dough. The batter or dough is then cooked to form a finished good such as by baking (e.g., for layer cakes, muffins, bread), or pan frying (e.g. crepes, pancakes, griddle cakes, Irish soda bread) or other means (e.g., microwave heating).

Such mixes generally include emulsifiers as essential ingredients. The emulsifiers are added to control or impart desired end product attributes such as volume, moistness, tenderness, and other eating qualities. Frequently, the emulsifiers are added to influence interaction between one or more added ingredients, such as the water and/or oil added. In other variations, emulsifiers can be added to dry mixes whereby the shortening or added oil constituent is reduced or even eliminated to provide low fat or low calorie finished baked goods.

While useful and effective, the emulsifiers frequently are the most expensive ingredients in a dry mix. Since many emulsifiers are many times as expensive as flour and sugar, even modest reductions in the amount of emulsifier required can dramatically reduce the cost of a dry mix for food products.

The present invention provides improvements in such dry mixes and components useful in such dry mixes whereby the efficacy of the emulsifier is improved allowing for lower emulsifier utilization levels which, in turn, provides reduced cost dry mixes for prepared foods.

The art includes various methods for emulsifier addition into such dry mixes. For example, emulsifiers are often admixed into the shortening component. One reason certain emulsifiers are added to the shortening component is that such emulsifiers have high melting points. By combining the emulsifier with the shortening component that is relatively easy to disperse, a greater dispersion of the emulsifier can be obtained.

Moreover, while dispersing the emulsifier within the shortening is useful, current consumer trends favor low fat or no fat products wherein the shortening ingredient is reduced or even absent entirely.

Still another technique for improving the dispersability of an emulsifier is to provide a spray dried substrate with the emulsifier plated onto the substrate. For example, a spray dried emulsifier complex comprising about 20% emulsifier and the balance lactose as a carrier has been used in dry mixes for layer cakes and in finished dessert baked goods.

While useful, such spray dried emulsifier products are expensive due to the relatively high cost of spray drying processing.

Given the state of the art, there is a continuing need for new and improved emulsifier materials useful for inclusion in dry mixes for prepared food products whereby the amount of costly emulsifier can be reduced.

Accordingly, it is an object of the present invention to provide new, more efficacious emulsifier materials useful for inclusion into dry mixes for prepared food products.

It is a further object of the present invention to provide such emulsifier materials that can be incorporated into dry mixes for prepared food products at reduced but effective emulsifier levels.

Still another object of the present invention is to provide emulsifier materials that are useful in the provision of dry mixes for prepared food products for finished food products characterized by reduced or low fat levels.

Still another object of the present invention is to provide methods for the preparation of such emulsifier materials. Another object is to provide methods for the use of such emulsifier materials.

Still another objective is to provide improved lower cost dry mixes for prepared foods that contain lower concentrations of emulsifiers but which provide comparable emulsifier performance by virtue of enhanced dispersion of the emulsifier.

Surprisingly, the above objectives can be realized and superior emulsifier materials provided as well as dry mixes containing such emulsifier materials. In the present invention, it has been discovered that the efficacy of emulsifiers can be improved by dispersing at least a portion of the emulsifiers in an amorphous low molecular carbohydrate matrix in powder form rather than in the conventional shortening component. Emulsifier materials are provided in the form of amorphous carbohydrate matrices containing the emulsifiers. The matrices are essentially characterized in part by a particle size of less than 1000 microns.

SUMMARY OF THE INVENTION

In its ingredient product aspect, the present invention provides a food composition useful as an emulsifier component in a dry mix for a prepared food, comprising: about 50 to 90% of the food composition of a glassy carbohydrate matrix, and about 10 to 50% of an emulsifier substantially evenly distributed within the glassy carbohydrate matrix. The food composition is in the form of a powder having a particle size of less than 1000 microns.

In its dry mix product aspect, the present invention resides in dry mixes containing flour, sugar, salt, leavening, optionally shortening and the present glassy carbohydrate matrix containing emulsifiers.

In its process of manufacture aspect, the present invention resides in processes for evenly distributing an emulsifier within a low molecular carbohydrate matrix. This method of manufacturing process comprises the steps of heating a solid carbohydrate above its melting point temperature to melt the carbohydrate to form a molten carbohydrate, admixing an emulsifier to the liquid mass to form a magma in which the emulsifier is evenly dispersed, cooling the magma to a temperature sufficiently low to allow the forming of the magma into strands, forming the cooled magma into strands, cooling the strands to obtain a solid matrix, having a glassy state, and size reducing the glassy carbohydrate matrix to a powder having a particle size of less than 1000 μm.

In its method of use aspect, the present invention resides in processes for incorporation of an emulsifier into a cooked, especially baked, food product. The methods of use comprise the steps of forming a mixture of a composition containing the emulsifier with a meltable carbohydrate having a melting point temperature and a glass transition temperature, heating the mixture to above the melting temperature of the carbohydrate to form a magma, cooling the magma, forming the magma into a plurality of endless strands or filaments wherein the emulsifier is substantially evenly distributed with the carbohydrate, cooling the strands to form a glassy matrix, size reducing the strands to form a powder having a particle size of less than 1000 microns, adding the glassy matrix in powder form to the remaining ingredients of the food product, and cooking the resultant mixture to form the cooked food product.

DETAILED DESCRIPTION OF THE INVENTION

Figure 1:
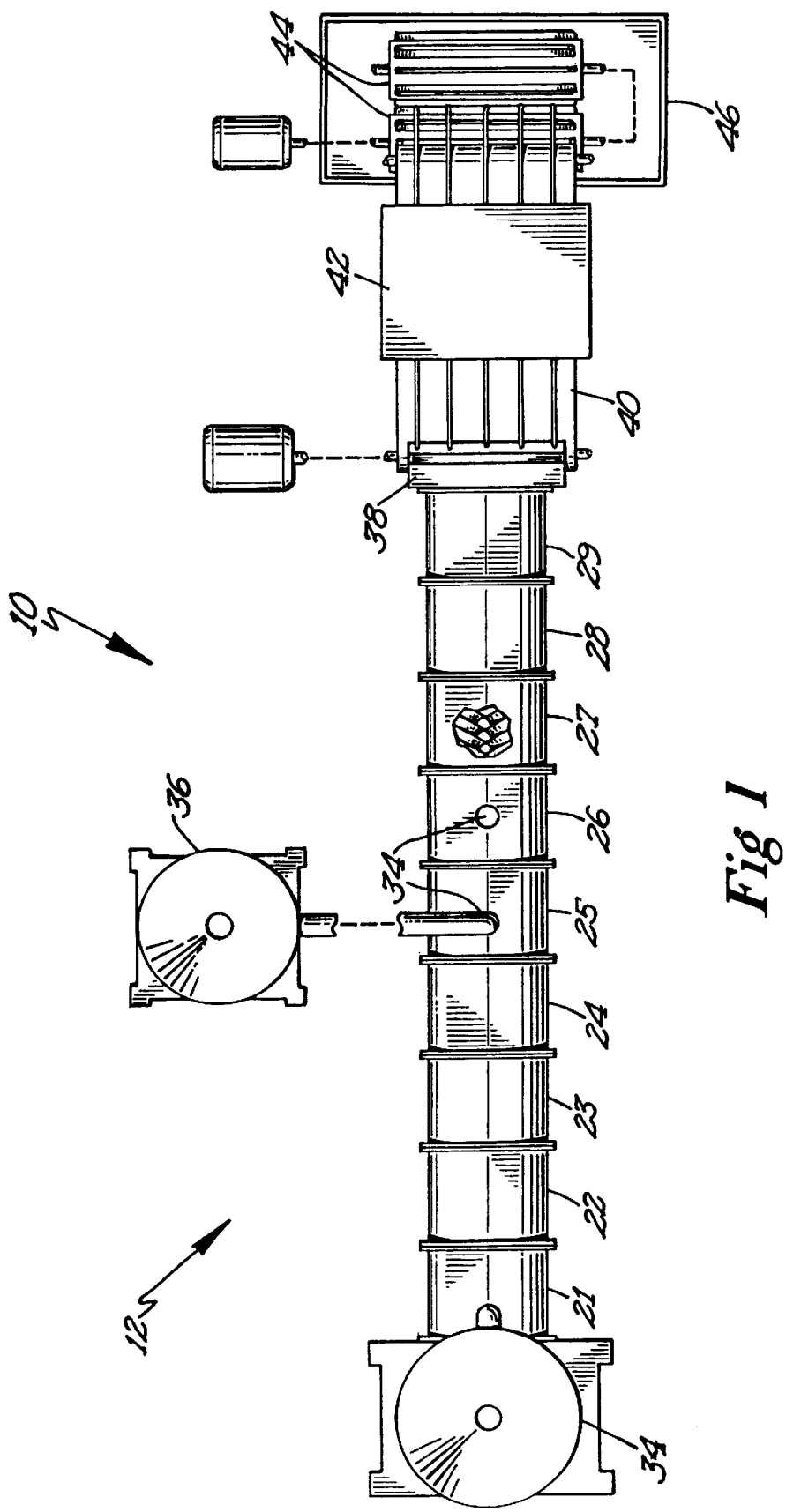
FIG. 1 is a highly schematic process flow diagram of a preferred embodiment of the present manufacturing methods that employ a cooker extruder.

The present invention provides powdery, glassy, low molecular weight carbohydrate matrices containing emulsifiers, dry mixes containing such matrices, as well as methods for the manufacture and use of such products. Each of the product ingredients, as well as the steps for the manufacture and use are described in detail below.

Throughout the specification and claims, percentages are by weight and temperatures in degrees Centigrade unless otherwise indicated.

Most broadly, the present invention provides an emulsifier ingredient food composition for use in dry mixes for prepared foods. The present food composition essentially first comprises about 50 to 90% of the food composition of a glassy carbohydrate matrix. The food composition additionally essentially comprises about 10 to 50% of an emulsifier. The emulsifier is encapsulated or substantially evenly entrapped within or entrained on or embedded into the glassy low molecular carbohydrate forming a matrix of the glassy low molecular carbohydrate and the emulsifier.

By "glassy" is meant a carbohydrate in a substantially amorphous or non-crystalline form such as by having been melted or heated to above its glass transition temperature and cooling to below its glass transition or melting point to form a glassy form of the carbohydrate. Thus, the skilled artisan will appreciate that the particular physical form of the present food composition is to be distinguished from a simple admixture or blending of the ingredients analogous to how a glass ceramic is distinctive from a simple admixture of soda ash and sand.

A wide variety of materials can be used alone or in combination as the carbohydrate matrix material. Broadly, carbohydrates useful herein are those having a molecular weight such that the carbohydrates can be melted using conventional food processing equipment. Preferred for use herein are low molecular weight carbohydrates having a molecular weight of about 180 to about 5400, preferably about 180 to 1800.

At the low end of the molecular weight range, a first class of useful carbohydrates herein are common mono or disaccharides including, for example, sucrose, glucose, lactose, and mixtures thereof. Preferred for use herein is sucrose due to its cost and lower hygroscopicity. Sucrose is also preferred because sucrose is generally an ingredient in the recipe for the baked goods for which the emulsifier will be used.

A second type of carbohydrate useful herein having higher molecular weights than simple sugars are maltodextrins having a dextrose equivalent (D.E.) in the range of about 4 to 20, preferably, a D.E. in the range of about 8 to 12. As those skilled in the food art are well aware, a variety of maltodextrins are readily available commercially and the skilled artisan will have no difficulty in selecting a maltodextrin for use herein.

A third class of useful carbohydrates having a higher molecular weight than simple sugars and a lower molecular weight than maltodextrins that are useful herein are corn syrup solids or polydextrose having a dextrose equivalent in the range of about 21 to about 97, preferably from about 36 to about 67. The term "corn syrups solids" is conventionally used to denote a mixture of carbohydrates produced by hydrolysis of corn starch and having dextrose equivalents in the range of about 21 to 42. Corn syrups can also be used. Corn syrups can range in D.E. from about 26 to 97. However, although such carbohydrates are usually produced by the hydrolysis of corn starch, any carbohydrate having equivalent dextrose may be employed in the matrices of the present invention. Thus, in particular, such carbohydrates may be produced by the polymerization of lower molecular weight carbohydrates rather than hydrolysis of high molecular weight starches. For example, "polydextrose," is produced commercially by Cultor Food Science.

While any material from the three classes can be used to prepare the present matrix, particularly useful herein for the carbohydrate is a mixture of sugars and maltodextrin, especially preferred for use herein is a mixture of sugars, especially sucrose and maltodextrin in the weight ratio range of sugar to maltodextrin of about 1:99 to 99:1, preferably about 4:1 to 1:4, and most preferably about 1:2 to 2:1. Such mixtures are preferred for the reason that the food compositions so prepared are readily melted and size reduced.

As noted above, good results are obtained when the food compositions generally comprise about 10 to 50% of the emulsifier. Excessive emulsifier concentrations are to be avoided since the benefits of enhanced emulsifier dispersion and the resultant efficiency of the emulsifier are rapidly lost at excessive emulsifier concentration in the present glassy matrices. Also, high emulsifier level compositions are difficult to process. Conversely, emulsifier levels in the food composition below 10% are to be avoided. At low levels of emulsifier, large amounts of the food composition are required without any corresponding benefit. Also, as the amount of glassy carbohydrate matrix increases, the other constituents in the dry mix must necessarily decrease. Therefore, inclusion of higher amounts of the preferred sugar maltodextrin matrix may adversely affect the prepared food products by reducing the amount of other desired components.

Useful as the emulsifier component herein are a wide variety of emulsifiers for dry mixes for prepared foods and the skilled artisan will have no difficulty in selecting particular emulsifiers for particular dry mix and use applications.

Generally useful as the emulsifier component are partially esterified polyhydric compounds having surface active properties. This class of emulsifiers includes among others, mono- and diglycerides of fatty acids, such as monopalmitin, monostearin, monoolein, and dipalmitin; partial fatty esters of glycols or polyglycerol esters ("PGE's"), such as propylene glycol monostearate and monobehenate; higher fatty acid esters of sugars, such as the partial palmitic and oleic acid esters of sucrose; and phosphoric and sulfuric acid esters, such as dodecyl glyceryl ether sulfate and monostearin phosphate. Other examples in de the partial esters of hydroxy carboxylic acids, such as lactic, citric, and tartaric acids with polyhydric compounds, for example, glyceryl lactopalmitate, and the polyoxyethylene ethers of fatty esters of polyhydric alcohols, such as a polyoxyethylene ether of sorbitan monostearate or distearate. Also useful are diacetyl tartaric acid esters of mono-and di-glycerides of fatty acids ("DATEMS"). Fatty acids alone or esterified with a hydroxy carboxylic acid, e.g., stearyl-2-lactylate, are also useful.

The skilled artisan will appreciate that such emulsifier materials are generally stable at room temperature conditions (i.e., are non-volatile).

In the most preferred form of the present invention, the emulsifier is a blend of 137 parts by weight of distilled monoglyceride (IV=ca 45) (commercially available from Danisco Ingredients, USA (New Century, Kans.), under the trade name Dimodon BPTK), 50 parts by weight of Stearoyl-2-lactylate, sodium (commercially available from American Ingredients, under the trade name Emplex Flake), and 50 parts by weight of Soft Diacetyl Tartaric Ester of Monoglyceride (Danisco, under the trade name Phanoden SDX).

If desired, the present emulsifier food compositions can additionally include about 0.1 to about 15% of an edible fatty triglyceride component. The edible fatty triglyceride component can serve as a diluent or carrier for the emulsifier to facilitate addition of the emulsifier into the food composition. The use of an edible fatty triglyceride diluent can be helpful, particularly when the emulsifier has an elevated melting point. However, excessive amounts of edible fatty triglyceride diluent are to be avoided. High oil levels can adversely affect the preparation of the present matrices. Also, some products are desirably low in total fat content.

The present emulsifier food composition matrices are further essentially characterized by a particular particle size. Useful herein are matrices in the form of a powder having a particle size of less than 1000 microns ($\mu$m), preferably less than 800 microns, and most preferably less than 500 microns. The particle size, however, should not be too fine to prevent dust problems during processing, for example, below 100 $\mu$m in size.

The present emulsifier containing glassy matrices find applicability for use in a wide variety of dry mixes for prepared foods. Generally, such dry mixes contain dry ingredients to which are added such liquid materials as water, milk, eggs, as well as liquid oil ingredients as vegetable oil, margarine, butter, etc. to form doughs or batters.

Dry mixes generally comprise flour, sugar, salt and leavening. Dry mixes include no-fat, low-fat and full fat variations. Generally, such dry mixes comprise about:

20 to 90% flour, preferably about 20 to 50%,
1 to 70% sugar, preferably about 20 to 55%,
0.1 to 4% salt, preferably about 0.5 to 3%,
0.5 to 4% leavening, preferably about 1 to 2%,
0 to 20% fat, preferably about 4 to 8%.

Optionally, the dry mixes can contain flavors, vitamins, minerals particulates (fruits, nuts, candies) starches, gums at conventional levels.

The dry mixes are combined with added liquid ingredients by the user and formed into finished prepared food items.

The present emulsifier containing matrices find particular suitability for use as an ingredient in dry mixes for the preparation of batters or doughs which are then cooked to form a finished goods such as by baking (e.g., for layer cakes, muffins, bread, angel food cakes, quick breads and the like) or by pan frying (e.g., pancakes, griddle cakes, crepes, Irish soda bread and the like).

The present emulsifier containing glassy carbohydrate matrices can be used in full or partial substitution for conventional emulsifier addition to such dry mixes. Generally, such dry mixes contain about 0.1 to 30% of the present matrices, depending upon such factors as emulsifier type, emulsifier concentration in the matrix desired finished prepared food and attributes thereof. Preferred dry mixes comprise about 1 to 10% of the present food composition matrix.

If desired, a portion of the total emulsifier present can be added in a conventional manner such as dispersed in a shortening component or added "over-the-side," i.e., simple admixing with the other dry ingredients such as the flour, sugar, spices, etc.

METHOD OF PREPARATION

The present encapsulated emulsifier glassy low molecular carbohydrate matrices are prepared by methods that essentially comprise a first step of heating a solid carbohydrate above its melting point to form a molten carbohydrate.

The particular melting point will depend upon a variety of factors. The first factor depends upon the average molecular weight of the particular carbohydrate or blend thereof.

A second factor affecting the melting point temperature is the moisture content. The dry carbohydrate materials will of necessity have some natural level of associated moisture, typically about 1 to 4% depending upon the hygroscopicity of the particular materials selected, environmental factors, handling times and the like. The glass transition temperature of the matrices of the present invention declines sharply with increasing water content in the matrix. If desired, modest levels of moisture addition bringing the total moisture to about 5 to 20%, preferably 5 to 10%, can be employed. However, such added moisture generally will have to be subsequently removed and for this reason the moisture addition is to be minimized.

Generally, however, the melting temperature of the carbohydrates having 1 to 10% moisture ranges from about 20 to 200° C. The carbohydrates are heated to above their melting point to allow for combining with the emulsifier. The carbohydrates can be heated to temperatures substantially higher than their melting point but no significant advantage is obtained by such elevated temperatures. The emulsifier is combined with the molten carbohydrate to form a molten mixture or magma. In one variation the emulsifier is combined with the dry materials prior to heating. In other variations, all or a portion of the materials can be separately heated and then combined to form the magma.

In preferred embodiments, the present method involves a step of reducing the moisture content of the magma to about 0.1 to 6%, preferably about 1 to 3%. Such a moisture reduction step is especially desirable to remove supplemental moisture added as a processing aid. In preferred embodiments the step involves the substeps of maintaining the magma under pressures of at least 1 to 5 bar at a temperature of 95 to 150° C., reducing the pressure to 0.7 to 1.5 bar, and most preferably to atmospheric pressure to flash off at least a portion of the moisture and venting the moisture.

Thereafter, the magma is cooled, and subsequently formed into strands and further cooled to below the glass transition temperature to form an amorphous non-crystalline solid carbohydrate matrix encapsulating the emulsifier. In order to be formed into strands, the molten magma must be cooled to form a plastic mass of sufficient viscosity as to be able to be shaped into strands. Good results are obtained when the temperature magma is reduced before forming from a hot temperature range of about 100 to 200° C. to a temperature range of about 40 to 90° C. After being formed into strands or ropes, the strands are further cooled to a temperature of about 5 to 40° C.

Prior to cooling to about 5 to 40° C., the strands can be quite sticky and difficult to handle. A preferred technique is to form filaments, strands or ropes of the matrix while partially cooled to a plastic deformable state such as a plurality of extrudate ropes ranging in diameter from about 2 to 5 mm.

Thereafter, the cooled glassy matrix is size reduced to form a powder having the requisite particle size. In the preferred embodiment, this particle size reduction step comprises a first substep of crushing the matrix pieces to produce a crushed or granular mixture and then grinding the granular mixture to form a crushed and ground matrix pulverant or powdered matrix.

The present glassy carbohydrate matrix of encapsulated emulsifier so prepared is then useful as an emulsifier ingredient for a variety of dry mix applications. The ingredient can be dry blended with other dry ingredients to form the present dry mixes as described above.

One technology for practicing the present methods is to employ a Fuisz machine such as is available from Fuisz Technologies, Ltd. (Chantily, Va.). A Fuisz machine can simplistically be compared to a cotton candy machine used to produce a glassy sugar floss confection. Another technology is to employ traditional boiled candy making apparatus and techniques to form the matrix pieces.

Surprisingly, however, in the preferred embodiment, a twin screw extruder is used to practice the present invention. A twin screw extruder can perform the mixing, heating, cooking/moisture reduction, cooling and forming steps all in a single piece of equipment. As a result, a twin screw extruder provides the advantage of a practical and commercially economical technique for practicing the invention. It has been found desirable to use extruders which have at least two screws and that are capable of providing multiple zones with differing temperatures.

In a less preferred embodiment, a twin screw extruder can be used to perform the mixing, heating and cooling steps while a second extruder, e.g., a single screw extruder, can be used to perform all but the mixing steps, for example, cooling and extruding in the form of filaments.

Referring now to FIG. 1, an apparatus for forming an improved emulsification system according to the methods of the preferred teachings of the present invention is shown in the drawings and generally designated 10. Generally, apparatus 10 includes a single screw, or preferably a twin screw extruder 12 formed of conventional components configured according to the teachings of the present invention. In the most preferred form, extruder 12 is formed of nine barrel sections 21–29 having screw configurations of 4 L/D. It should be realized that greater or smaller number of barrel sections can be utilized and is particularly dependent on the L/D of the particular screws thereof.

Specifically, dry low molecular carbohydrate feed or starting material is fed such as by feeder 32 into barrel section 21. The dry material is generally free of added moisture and specifically has a moisture content of less than 1.0%. However, water may be added in section 21 to the dry material in an amount from about 2 to 6% to facilitate at least partial dissolving of the dry material in extruder 12 as described below. All or part of the emulsifier(s) can be admixed with the dry carbohydrate feed material. The screw elements in barrel section 21 are of a relatively high pitch, so as to rapidly convey the dry material from section 21 into section 22 so that further dry material can be continuously added to section 21.

Sections 22–24 are heated by the circulation of a heated medium through manifolds therein, with the heated medium having a temperature in the order of 200° C. and in the most preferred form having a temperature of 204.4° C. The function of the screw elements in barrel section 22 is to increase the degree of fill of the material in the screw elements and thereby increase the transfer of material at the inner barrel surface for increasing the heat transfer from sections 22 to 24 to the material and for mixing the material.

The screw elements in barrel section 23 can include intermediate kneading discs which scrape the material against the inner barrel surface for further increasing the heat transfer from section 23.

The screw elements in barrel section 24 include mixing and kneading discs for increasing the heat transfer from section 24.

In sections 22–24, the temperature of the material is increased sufficiently to melt the material and in the most preferred form is increased to a temperature of about 135 to 165° C.

In barrel section 25, the screw elements can include a reverse pitch conveying element which conveys the melted material backwards to increase the time that the melted material remains in the heating and mixing sections 22–24, with the pressure of the melted material increasing as a result. Although the reverse pitch conveying element conveys the melted material in a negative direction, the net flow is in the positive direction. When the material passes from the reverse pitch conveying element to the downstream screw elements, the melted material moves from a high pressure zone (about 3 to 20 bar) to a lower pressure zone (about 1 to 3 bar), thereby experiencing a pressure drop. Additionally, barrel sections 25 and 26 are heated by the circulation of a heated medium through the manifolds thereof, with the heated medium having a temperature less than the heated medium of barrel sections 22–24 but sufficient to maintain the material temperature at least above 100° C. Specifically, in the preferred form, the heated medium circulated through barrel sections 25 and 26 is of a temperature in the order of 100 to 140° C., preferably about 100 to 120° C. Barrel sections 25 and 26 include suitable vents 34 which expose the melted material and evaporated water to atmospheric pressure and allow the evaporated water to escape to the atmosphere. In the preferred form, the time that the melted material remains in sections 25 and 26 is sufficient to evaporate unnecessary moisture and specifically to reduce the moisture to less than 5% and preferably less than 2% of the total material.

As set forth previously, the reason water is added even though it is later removed as being undesirable is that water facilitates dissolving of the dry material and its melting into a molten mass. However, it can be appreciated that it is desirable to minimize the amount of water added to reduce the necessity of its later removal and to minimize the moisture content of the final product.

In one preferred embodiment, the screw elements in barrel sections 25 and 26 after the reverse pitch conveying element are of a low pitch to reduce the conveying speed of the material in sections 25 and 26 so that the material resides in sections 25 and 26 for a sufficient time to remove the unnecessary moisture. In this embodiment, moisture removal is accomplished by exposing the material to high temperatures for longer residence times. In another preferred form, however, the screw elements include elements of high pitch so that the material is moved to the surface of the screw elements to enhance the evaporation of water from the material by virtue of forming thin film at the vent region.

Apparatus 10 further includes means 36 for introducing at least one emulsifier to extruder 12 at a point downstream of the reverse screw element of section 25. In the preferred form, at least a portion of the emulsifier is added in sections 25 and/or 26 through the vents 34. The addition of the emulsifier is practically advantageously executed using a positive displacement pump. An emulsifier having high melting points can be added at temperatures above their melting point as a liquid or can be added at temperatures below their melting point as a solid using solid feeding apparatus.

Still referring to FIG. 1, barrel sections 28–29 can be either heated or preferably can be cooled by the circulation of a chilled medium through the manifolds thereof, with the chilled medium having a temperature in the order of −20 to −10° C., preferably about −12° C. The screw elements in barrel sections 27 and 28 include conveying elements intermixed with mixing elements. The temperature of the magma material in sections 27–29 is preferably reduced to about 40 to 90° C. so that the material viscosity increases sufficiently that the material can be shaped and maintain its shape. At this temperature, the material is plastic.

The screw elements in barrel section 29 include only conveying elements for conveying the material to and through a die 38 including multiple ports. The ports in die 38 are preferably arranged linearly in a horizontal plane to prevent interference of the extrudates leaving die 38 which are solid but sticky. Optionally, die 38 can be temperature controlled to facilitate better material flow through the ports of die 38, with die 38 being heated in some instances while being cooled in other instances. Die 38 can be temperature controlled such as by circulating a heat-transfer medium through an internal manifold and channels formed in die 38 and around the ports thereof.

In the most preferred form, the extrudates are deposited across a take away endless conveyor 40 which transports the extrudates through a cooling device 42. Device 42 can be of any conventional operation such as by chilled air impingement, addition of carbon dioxide, flooding with liquid nitrogen or by other processes. When the extrudates are cooled to about 5 to 20° C., they become very brittle.

The amount of time that the extrudates reside in device 42 is a function of the temperature of the material when it exits die 38, the type of cooling device 42, and the size of the extrudates. In the preferred form, the diameter of the ports in die 38 and thus of the extrudates are less than 5 mm, preferably less than 3 mm, more preferably less than 2 mm, and most preferably in the order of 1 mm. Operational difficulties may result from small diameter extrudates including insufficient strength of the extrudates to pass from die 38 to conveyor 40 without falling apart, insufficient mass of the extrudates to prevent movement under the cooling process of device 42 and the like. In the most preferred form, the amount of time between when the extrudates leave die 38 and when they reach crusher 44 is in the order of five to 10 seconds.

After cooling, the extrudates are size reduced such as by crushing in a crusher 44. After crushing, the crushed extrudates are further size reduced or ground by a grinder 46 such as a hammer mill to form a powder having a particle size as large as 1000 microns but preferably smaller than 800 microns and most preferably less than 500 microns but greater than 300 $\mu$m.

Figure 2:
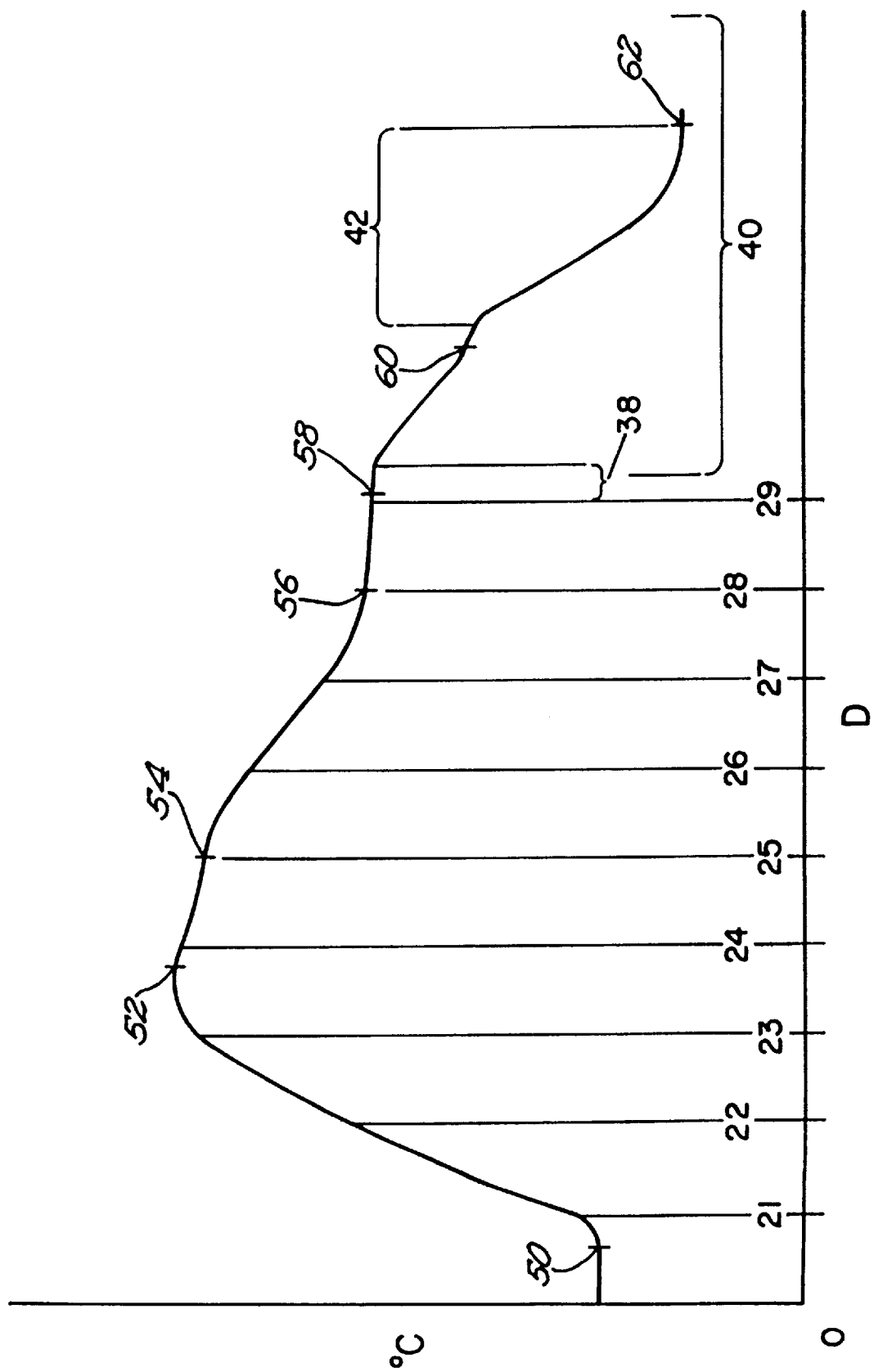
FIG. 2 is a graph of temperature with distance showing the temperature of the matrix at various steps of the present process.

Reference is now made briefly to FIG. 2 which depicts in relative terms (i.e., is not to scale) the temperature of the material as it advances through the process. FIG. 2 shows that the starting material has an initial temperature designated by reference numeral 50 as it enters into the extruder. As the material is heated, it reaches the elevated temperature 52 as the material advances through extruder sections 21–24. During the evaporative moisture reduction step, the material can experience a modest reduction in its temperature indicated by the line segment in FIG. 2 between reference numeral 52 and 54. Thereafter, the material is cooled within the extruder as indicated by the line segment between reference numerals 54 and 56. Thereafter, the material in a plastic state is extruded as filaments having a substantially even temperature indicated by the line segment defined by reference numerals 56 and 58. Thereafter, the material experiences a reduction in temperature as it is conveyed by the endless take away conveyor. However, in the preferred embodiment, the material is rapidly cooled as described above through the cooling device 42 whereby the extrudates are cooled to about 5 to 20° C. The rapid cooling is depicted in FIG. 2 by the line segment defined by reference numerals 60 and 62.

Extruder 12 utilized in the examples was a Buhler twin screw extruder operating in the preferred conditions set forth, with a feed rate for the dry material and crystalline sugar being 200 lbs per hour while the feed rate for the emulsifier blend being 34 lbs per hour.

The present invention then provides an effective process for encapsulating an emulsifier blend into a carbohydrate matrix for purposes of increasing its efficacy, with the process being performed on a continuous basis and in the most preferred form utilizing a twin screw extruder configured according to the teachings of the present invention. The degree of dispersion of the emulsification system in a bakery mix is key in improving quality attributes of baked products such as texture, volume, pore structure, and the like and in preserving the freshness of the baked products, while minimizing the amount of emulsifiers required.

It should be appreciated that the process according to the teachings of the present invention is not limited to any specific extruder 12 but a person skilled in the art can choose different configurations of barrel sections and screw elements. Generally, extruder 12 includes a portion for intaking dry ingredients. After the intake portion, extruder 12 includes a portion for melting the dry ingredients which is typically in the range of 8 to 20 L/D. After the melting portion, extruder 12 includes a portion for evaporating the moisture which has a length depending upon water content of the melted material and typically in the range of 3 to 12 L/D and preferably in the order of 8 L/D. After the evaporating portion, extruder 12 includes a portion for cooling and mixing the material which is typically in the range of 4 to 16 L/D and preferably in the order of 12 L/D. Likewise, the process according to the teachings of the present invention may be accomplished utilizing apparatus other than twin screw extruder 12 of the preferred form.

EXAMPLE 1

This example prepares emulsifier food composition matrices of the present invention and compares them with spray dry extended emulsifiers in a dry mix for layer cake.

Premixes of dry carbohydrate were prepared by blending the following ingredients for 10 minutes with a ribbon mixer:

|  | Example 1 | Example 2 |
| --- | --- | --- |
| Corn syrup solids - 36 D.E. | 156.3 lbs | 93.6 lbs |
| (Dextrose Equivalent) | 156.3 lbs | 93.6 lbs |
| Confectioners sugar - 12X with 3% corn starch | 93.6 lbs | 156.3 lbs |

An emulsifier blend was prepared, melted, mixed and used molten having the following formulation:

|  | Example 1 (continued) | Example 2 (continued) |
| --- | --- | --- |
| Distilled monoglyceride (IV = ca 45) | 137 lbs | 137 lbs |
| Stearoyl-2-lactylate, sodium | 50 lbs | 50 lbs |
| Soft diacetyl tartaric ester of monoglyceride | 50 lbs | 50 lbs |

The carbohydrate and emulsifier were processed to form a glassy carbohydrate matrix encapsulating the emulsifier in a Buhler twin screw extruder having the following conditions:

| | | |
| --- | --- | --- |
| Barrel sections 2–4, temperature ° F. | 400 | 400 |
| Barrel sections 5–6, temperature ° F. | 275 | 275 |
| Barrel sections 7–9, temperature ° F. | 10 | 10 |
| Screw speed, rpm | 144 | 144 |
| Torque, Nm | 81 | 95 |
| Die temperature ° F. | 118 | 107 |
| Die pressure, PSI | 15 | 73 |
| Carrier feed rate, lb/hr | 200 | 200 |
| Emulsifier feed rate, lb/hr | 34 | 34 |

The emulsifier content of the glassy matrix was about 14.5%.

The extrudate was then cooled to form a hardened glassy matrix product and ground with a hammer mill to form the present finished intermediate emulsifier products.

The functionality of the emulsifier carbohydrate matrix products was then compared to the same emulsifier blend and spray dried onto a lactose carrier ("Control").

Finished baked layer cakes were baked using a "standard" yellow cake mix prepared without any other added emulsifiers. To prepare such layer cake baked goods, cake batters were prepared having the following ingredients:

|  | Control | Example 1 | Example 2 |
| --- | --- | --- | --- |
| Cake mix | 487 g | 487 g | 487 g |
| Emulsifier premix 20% on lactose | 16.9 | | |
| Emulsifier, Example 1 | | 22.6 | |
| Emulsifier, Example 2 | | | 22.6 |
| Soybean oil | 65 | 65 | 65 |
| Whole egg | 150 | 150 | 150 |
| Water | 285 | 285 | 285 |
| Cake height, mm center/side | 50/42 | 50/44 | 50/44 |
| Comment | Standard | More moist than standard | More moist than standard |

Cakes were then made with a control emulsifier of a blend processed with a spray drier on lactose, 20% emulsifier, in amount of 16.9 grams and the emulsifier examples 1 and 2, each in the amount of 22.6 grams. More matrix product of the present invention (14.5% emulsifier) content was used than the control (20% emulsifier) so that the emulsifier concentrations were substantially equivalent.

A standard yellow cake mix prepared without added emulsifiers was utilized in the amount of 487 grams. In addition, soybean oil in the amount of 65 grams, whole egg in the amount of 150 grams, and water in the amount of 285 grams were mixed with the cake mix and emulsifier.

After baking, the cake heights for the cakes were measured, with the center of all three cakes having a height of 50 mm whereas the cakes baked with the example emulsifiers had a height of 44 mm at the side in comparison to 42 mm at the side for the cake baked with the control emulsifier. The cakes baked with the example emulsifiers were also found to be more moist than the cake baked with the control emulsifier.

The results of this testing showed that emulsifier food compositions of the present invention used at comparable emulsifier levels produced finished baked goods of comparable volume and shape compared to dry mixes containing conventional, more expensive spray dried emulsifiers on a lactose carrier. Surprisingly, the finished baked goods of the present invention exhibited superior texture and eating quality attributes.

What is claimed is:

1. A food composition useful as a component in a dry mix for a prepared food, comprising:
   about 50 to 90% of a low molecular weight glassy carbohydrate matrix, and
   about 10 to 50% of an emulsifier encapsulated within the glassy carbohydrate matrix,
   wherein the food composition is in the form of a powder having a particle size of less than 1000 microns.

2. The food composition of claim 1 having a moisture content of about 0.1 to 10%.

3. The food composition of claim 2 comprising about 60 to 80% of the food composition of the glassy carbohydrate matrix and about 20 to 40% of the emulsifier.

4. The food composition of claim 3 wherein the carbohydrate has an average molecular weight ranging from about 180 to 5400.

5. The food composition of claim 4 wherein the carbohydrate includes a member selected from the group consisting of 1) sugars, 2) maltodextrins, 3) corn syrup solids, or corn syrups, and mixtures thereof.

6. The food composition of claim 5 wherein the powder has a particle size greater than 150 μm and wherein the carbohydrate matrix comprises about 1 to 99% (dry weight basis) of sugars, about 1 to 99% (dry weight basis) of maltodextrin, and about 1 to 99% (dry weight basis) of corn syrup or corn syrup solids.

7. The food composition of claim 6 wherein the weight ratio of sugars to maltodextrin ranges from about 1:4 to 4:1.

8. The food composition of claim 7 wherein the emulsifier is selected from the group consisting of mono- and di-glycerides, polyglycerol esters, higher fatty acid esters of sugars, partial esters of hydroxy carboxylic acids, polyoxyethylene ethers of fatty acid esters of polyhydric alcohols, diacetyl tartaric acid esters of mono- and di-glycerides of fatty acids, fatty acid esters of hydroxy carboxylic acid and mixtures thereof.

9. The food composition of claim 8 having a particle size of less than 500 μm.

10. The food composition of claim 9 having been at least prepared in part by extruding of the food composition in a twin screw extruder.

11. A dry mix for food products, comprising:

A. 20 to 90% flour;

B. 1 to 70% sugar;

C. 0.1 to 4% salt;

D. 0.5 to 4% leavening;

E. 0 to 20% fat; and

F. about 1 to 30% of a glassy carbohydrate matrix encapsulating an emulsifier, said matrix comprising:
   1. about 50 to 90% of a glassy carbohydrate matrix,
   2. about 10 to 50% of an emulsifier.

* * * * *